(12) United States Patent
Buxton

(10) Patent No.: US 7,234,588 B1
(45) Date of Patent: Jun. 26, 2007

(54) MERGE CONVEYOR

(75) Inventor: Lawrence Anthony Buxton, McKinney, TX (US)

(73) Assignee: FKI Logistex Inc., Louisville, KY (US)

( * ) Notice: Subject to any disclaimer, the term of this patent is extended or adjusted under 35 U.S.C. 154(b) by 0 days.

(21) Appl. No.: 11/301,680

(22) Filed: Dec. 13, 2005

(51) Int. Cl.
*B65G 15/60* (2006.01)
(52) U.S. Cl. ................................. 198/839; 198/831
(58) Field of Classification Search ............... 198/839, 198/831, 841, 832, 840
See application file for complete search history.

(56) References Cited

U.S. PATENT DOCUMENTS

| 2,128,594 | A | 8/1938 | Rasmussen |
|---|---|---|---|
| 2,128,595 | A | 8/1938 | Rasmussen |
| 2,222,019 | A | 11/1940 | Buchanan |
| 2,561,708 | A | 7/1951 | Milik |
| 2,798,590 | A | 7/1957 | Raskin |
| 3,016,127 | A | 9/1962 | Cooper |
| 3,189,166 | A | 6/1965 | Ziller |
| 3,253,698 | A | 5/1966 | Murphy |
| 3,799,319 | A | 3/1974 | Cutler et al. |
| 4,655,340 | A | 4/1987 | Steel |
| 4,987,994 | A | 1/1991 | Kelsey |
| 5,083,657 | A | 1/1992 | Kelsey |
| 5,421,449 | A | 6/1995 | Coxon |
| 5,743,379 | A | 4/1998 | Warnecke |
| 5,950,806 | A | 9/1999 | Warneke |
| 6,145,653 | A | 11/2000 | Mensch |
| 6,276,520 | B1 | 8/2001 | Mensch |
| 6,662,937 | B2 | 12/2003 | Warnecke |
| 6,685,010 | B2 | 2/2004 | Warnecke |

FOREIGN PATENT DOCUMENTS

| DE | 3726747 | 2/1989 |
|---|---|---|
| DE | 3811022 | 10/1989 |
| GB | 433756 | 8/1935 |
| GB | 2156760 | 10/1985 |
| GB | 2189758 | 11/1987 |

(Continued)

OTHER PUBLICATIONS

Publication titled "The Horsley Company Baggage Handling Conveyor Equipment"; The Horsley Company, Ogden, Utah, U.S.A. Depicted product is admitted to be prior art.

(Continued)

*Primary Examiner*—James R. Bidwell
(74) *Attorney, Agent, or Firm*—Dinsmore & Shohl LLP

(57) ABSTRACT

A merge conveyor defines a travel pathway for moving cargo. A tail pulley has a first rotational axis which is perpendicular to the travel pathway. First and second nose bars are parallel and spaced and are disposed at an angle with respect to the travel pathway. A drive pulley has a second rotational axis which is parallel with the travel pathway. A snub pulley has a third rotational axis which is parallel with the first rotational axis. An endless belt is sequentially routed over the tail pulley, the first nose bar, the drive pulley, the second nose bar, and the snub pulley. The endless belt extends directly from the second nose bar to the snub pulley and then directly to the tail pulley.

23 Claims, 4 Drawing Sheets

FOREIGN PATENT DOCUMENTS

| | | |
|---|---|---|
| JP | 63230412 | 9/1988 |
| JP | 64002908 | 1/1989 |
| JP | 2193803 | 7/1990 |
| JP | 3088608 | 4/1991 |

OTHER PUBLICATIONS

Publication titled "Model 9451/9457/9459 Compact 45 Degree Merge"; Siemens Logistics and Assembly Systems, Inc., Grand Rapids, Michigan, U.S.A. May 31, 2005. Depicted product is admitted to be prior art.

MERGE CONVEYOR

TECHNICAL FIELD

The present invention relates to a merge conveyor for use as part of a conveyor system for movement of cargo.

BACKGROUND OF THE INVENTION

A merge conveyor can be inserted into a conveyor system to facilitate movement of cargo to or from a conveyor line. Conventional merge conveyors suffer from any of a variety of design deficiencies. For example, some conventional merge conveyors are not compactly configured, and accordingly require excessive floor space and/or engineering for installation into a conveyor system. Also, some conventional merge conveyors, due to their specific belt travel configurations, are unable to accommodate use of an endless belt having a tacky or sticky side (often called a "cover surface" or a "cover belt"), whereby such an endless belt can provide certain advantages with respect to transportation of certain cargo and improved friction qualities at the drive pulley. Furthermore, the tension of the endless belt present on some conventional merge conveyors cannot be easily adjusted, which can accordingly present significant maintenance inefficiencies. Accordingly, there is a need for a merge conveyor which resolves one or more of these and/or other deficiencies of conventional merge conveyors.

SUMMARY OF THE INVENTION

In accordance with one embodiment of the present invention, a merge conveyor comprises a frame, a tail pulley, a first nose bar, a drive pulley, a second nose bar, a snub pulley and an endless belt. The frame defines a travel pathway for moving cargo. The travel pathway extends from a first end to a second end. The tail pulley is supported by the frame adjacent to the first end of the travel pathway and has a first rotational axis which is perpendicular to the travel pathway. The first nose bar is supported by the frame adjacent to the second end of the travel pathway and is disposed at an angle with respect to the travel pathway. The drive pulley is supported by the frame and has a second rotational axis which is parallel with the travel pathway. The second nose bar is supported by the frame and is parallel with and spaced from the first nose bar. The snub pulley is supported by the frame and has a third rotational axis which is parallel with the first rotational axis. The endless belt is sequentially routed over the tail pulley, the first nose bar, the drive pulley, the second nose bar, and the snub pulley. The endless belt extends directly from the second nose bar to the snub pulley and then directly to the tail pulley.

In accordance with one embodiment of the present invention, a merge conveyor comprises a frame, a tail pulley, a first nose bar, a slider bed, a drive pulley, a second nose bar, a snub pulley, a drive motor, a right-angle gearbox, an endless belt, and at least one side guard. The frame defines a travel pathway for moving cargo which extends from a first end to a second end. The tail pulley is supported by the frame adjacent to the first end of the travel pathway. The tail pulley has a first rotational axis which is perpendicular to the travel pathway. The first nose bar has a substantially circular cross-sectional shape and is non-rotatably supported by the frame adjacent to the second end of the travel pathway. The first nose bar is disposed at an angle with respect to the travel pathway. The angle is within a range from about 30 degrees to about 60 degrees. The slider bed has a surface adjacent to the travel pathway and which extends at least partially between the tail pulley and the first nose bar. The drive pulley is supported by the frame and has a second rotational axis which is parallel with the travel pathway. The drive pulley is lagged. The second nose bar has a substantially circular cross-sectional shape and is non-rotatably supported by the frame and is parallel with and spaced from the first nose bar. The snub pulley is supported by the frame and has a third rotational axis which is parallel with the first rotational axis. The drive motor is oriented in a direction perpendicular to the first rotational axis and the second rotational axis. The right-angle gearbox operatively couples the drive motor to the drive pulley. The endless belt is sequentially routed over the tail pulley, the slider bed, the first nose bar, the drive pulley, the second nose bar, and the snub pulley. The endless belt extends directly from the second nose bar to the snub pulley, and then directly to the tail pulley. A portion of the endless belt contacts the slider bed and is configured to support cargo. The at least one side guard is attached to the frame and is configured to maintain cargo within the travel pathway upon the endless belt.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF EMBODIMENTS

Figure 1:
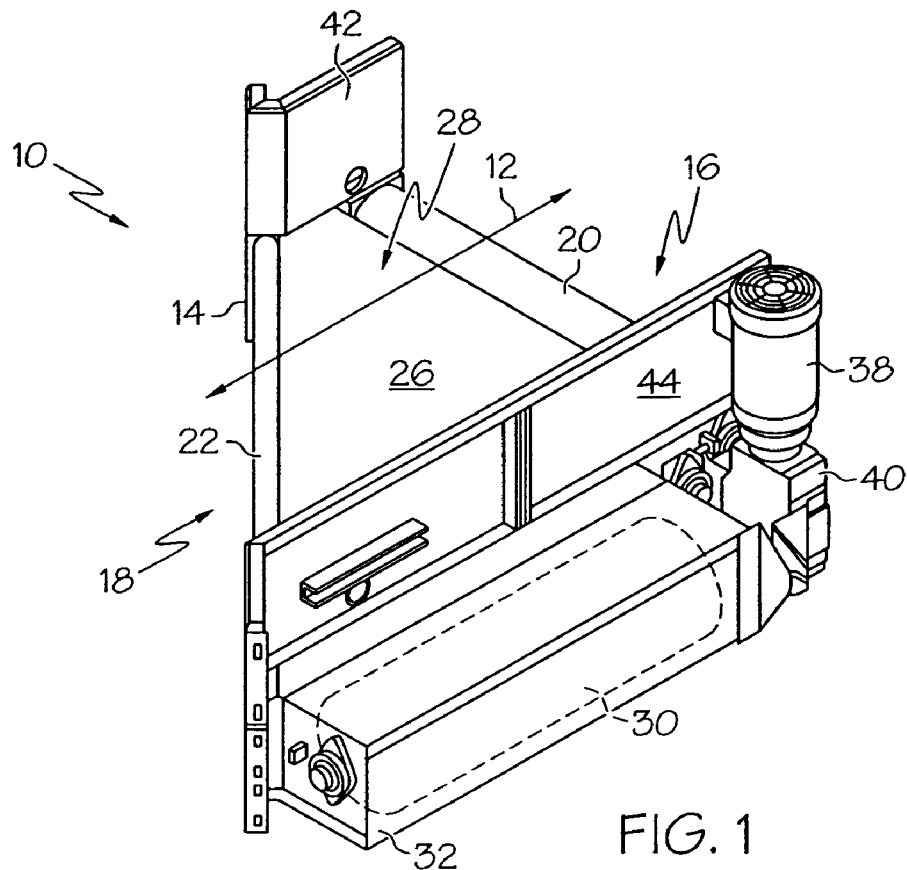
FIG. 1 is a perspective view depicting a merge conveyor in accordance with one embodiment of the present invention.
Figure 2:
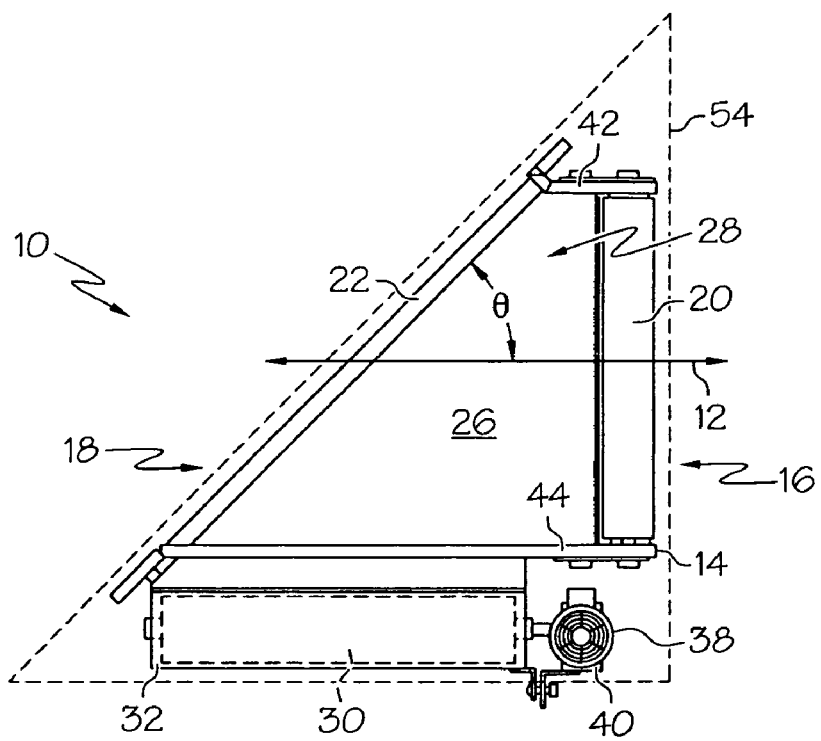
FIG. 2 is a top view depicting the merge conveyor of FIG. 1.

The present invention and its operation is hereinafter described in detail in connection with the views of FIGS. 1–7, wherein like numbers indicate the same or corresponding elements throughout the views. Referring now to FIG. 1, a merge conveyor 10 in accordance with one embodiment of the present invention is depicted to provide a travel pathway 12 for cargo. It will be appreciated that cargo can include baggage, packages, product, and any other items or material suitable for conveyance. The merge conveyor 10 can be inserted into a conveyor system to facilitate movement of cargo to or from a conveyor line, for example. In particular, the merge conveyor 10 is shown to have a first end 16 and a second end 18. The merge conveyor 10 can be configured such that it can facilitate movement of cargo along the travel pathway 12 from the first end 16 to the second end 18, and/or to facilitate movement of cargo along the travel pathway 12 from the second end 18 to the first end 16. Accordingly, the merge conveyor 10 can be configured to selectively operate in either a forward direction or a reverse direction.

The merge conveyor 10 is shown to comprise a frame 14. In one embodiment, the frame can assembled (e.g., welded) from steel (e.g., 10 gauge steel), although other frame configurations could alternatively be provided. Multiple devices for interfacing an endless belt can be supported by the frame 14. For example, referring to FIGS. 1–6, those devices can include a tail pulley 20, a first nose bar 22, a second nose bar 24, a drive pulley 30, a snub pulley 34, and a slider bed 28. An endless belt 36 can be routed sequentially over each of these devices as shown, for example, in FIGS. 1–6 and as described in further detail below.

In particular, the tail pulley 20 can be supported by the frame 14 adjacent to the first end 16 of the travel pathway 12. The tail pulley 20 can have a first rotational axis $R_1$ (see FIG. 6) which is perpendicular to the travel pathway 12. The first nose bar 22 can be supported by the frame 14 adjacent to the second end 18 of the travel pathway 12. The first nose bar 22 can be disposed at an angle θ with respect to the travel pathway 12. In one embodiment, this angle θ may range from about 30° to about 60°. In another embodiment of the present invention, as shown in FIGS. 1–6, this angle θ may be about 45°. The second nose bar 24 can be supported by the frame 14 in a position parallel with, and spaced from, the first nose bar 22. In the embodiment depicted in FIGS. 1–6, the second nose bar 24 is shown to be disposed vertically below the first nose bar 22.

The slider bed 28 provides support for an endless belt 36, and the slider bed 28 is shown to be supported by the frame 14 adjacent to the travel pathway 12. An upper surface (e.g., surface 26) of the slider bed 28 can extend at least partially between the tail pulley 20 and the first nose bar 22. While the surface 26 of the slider bed 28 is shown to comprise a substantially flat piece of material for providing underlying support for a cargo-carrying portion of the endless belt 36, it will be appreciated that such support could alternatively be provided in any of a variety of other configurations. For example, in one alternative embodiment, one or more rollers or pulleys might be positioned beneath the cargo-carrying portion of the endless belt in place of, or in addition to, a substantially flat piece of material.

Figure 6:
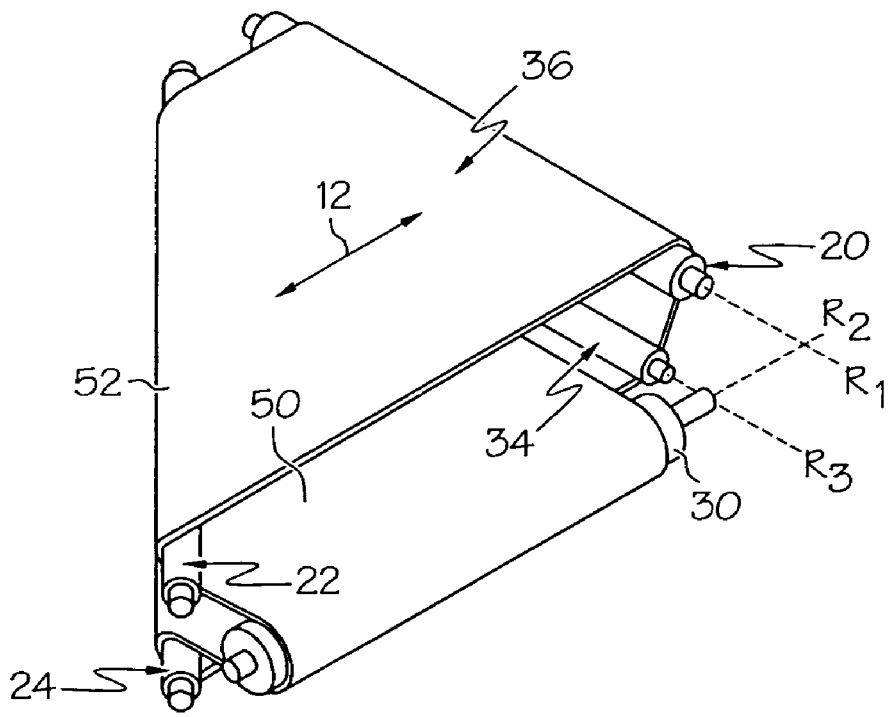
FIG. 6 is a perspective view depicting certain components of the merge conveyor of FIGS. 1–3 in conjunction with an endless belt.

The drive pulley 30 can be supported by the frame 14 and has a second rotational axis $R_2$ which is shown in FIG. 6 to be parallel with the travel pathway 12. In accordance with one embodiment of the present invention, the drive pulley 30 can be provided with lagging or traction (e.g., bumps, ridges or some other rough circumferential surface) in order that the drive pulley 30 can effectively grip the endless belt 36.

Figure 3:
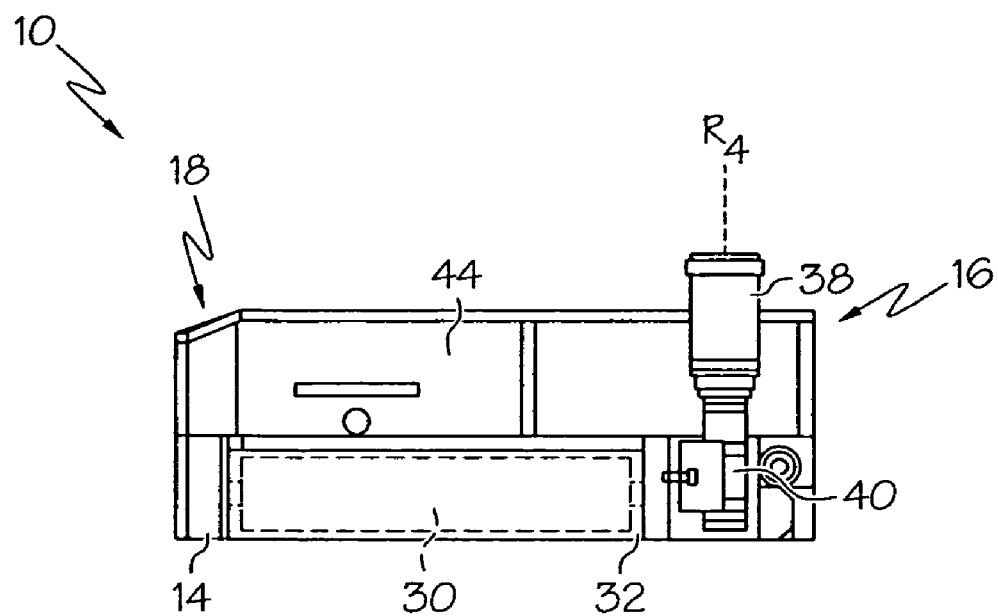
FIG. 3 is a side view depicting the merge conveyor of FIGS. 1–2.
Figure 4:
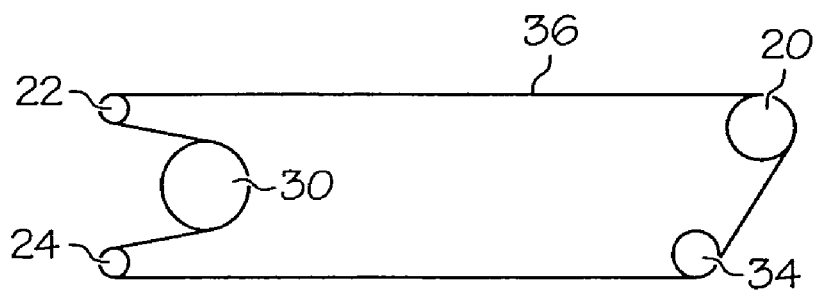
FIG. 4 is a schematic view depicting travel of an endless belt upon the merge conveyor of FIGS. 1–3.

The drive pulley 30 can be operatively coupled with a drive motor 38. For example, a gearbox 40 can be provided to operatively couple the drive motor 38 to the drive pulley 30. In one embodiment of the present invention, the gearbox 40 can comprise a right-angle gearbox. However, it will be appreciated that other gearboxes could alternatively be employed to operatively couple the drive motor 38 with the drive pulley 30, or that such coupling might occur without use of a gearbox. For example, a belt and/or chain drive might additionally or alternatively be provided to couple a drive motor with the drive pulley 30. As shown in FIG. 3, the drive motor 38 can be coupled with the gearbox 40 such that the drive motor 38 is longitudinally oriented in a direction perpendicular to the first rotational axis $R_1$ and the second rotational axis $R_2$. In this orientation, the rotational axis $R_4$ of the drive motor 38 is vertically oriented with respect to the travel pathway 12. The gearbox 40 can also be configured such that the drive motor 38 is disposed in a position above that of the endless belt 36, such that a portion of the endless belt 36 lies below the entirety of the drive motor 38, as shown in FIG. 3 (where the drive motor 36 is above the portion of the endless belt 36 extending between the second nose bar 24 and the snub pulley 34). The drive motor 38 can, in some circumstances, be rated for use with a variable frequency and/or voltage motor controller (e.g., an inverter).

Figure 7:
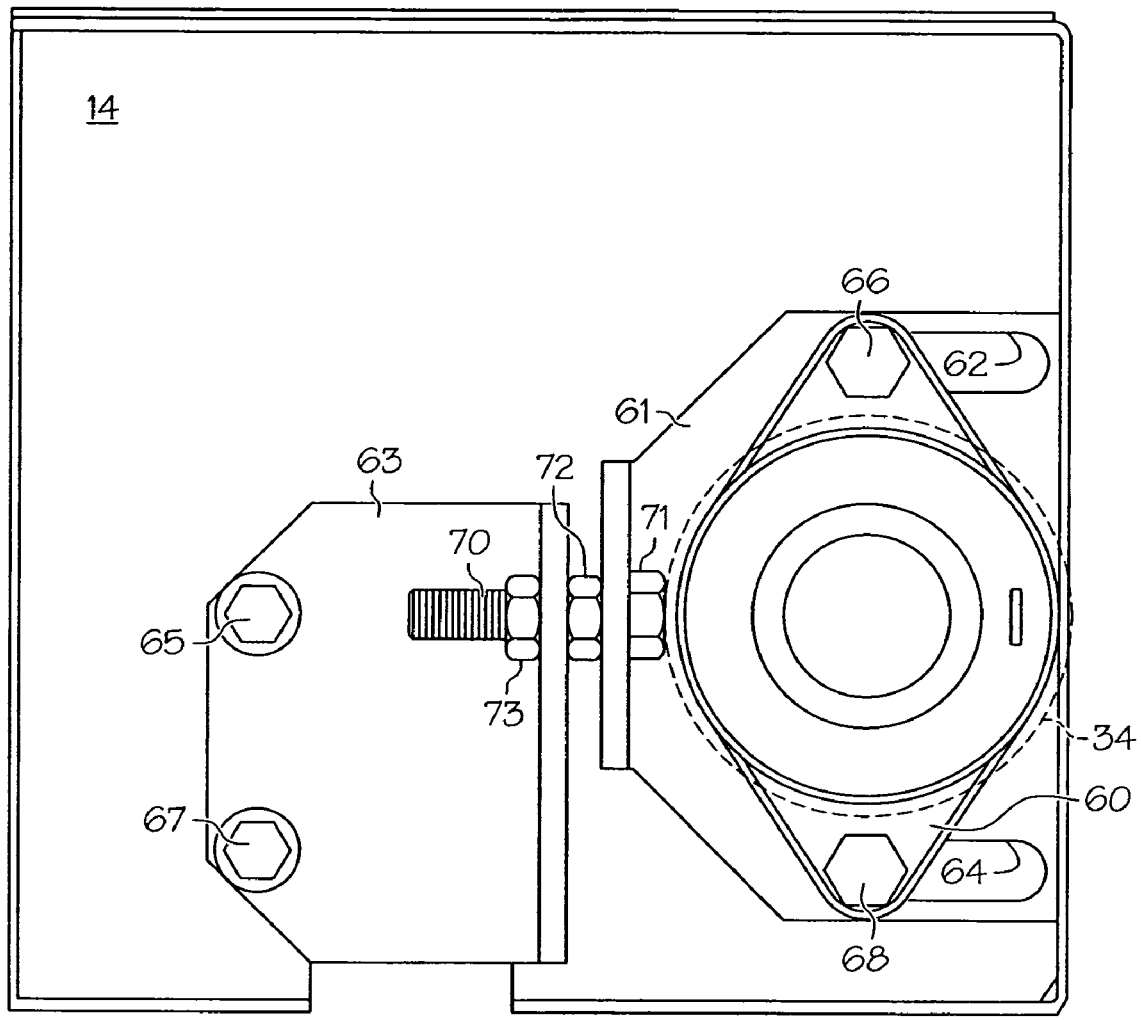
FIG. 7 is a plan view depicting certain components of the merge conveyor of FIGS. 1–3.

The snub pulley 34 can be supported by the frame 14 and has a third rotational axis $R_3$ which can be parallel with the first rotational axis $R_1$. The snub pulley 34 can be configured to be moveable in order that tension on the endless belt 36 can be adjusted. Accordingly, the snub pulley 34 can be moved or adjusted in order to increase or decrease tension on the endless belt 36, and/or to adjust tracking of the endless belt 36 within the merge conveyor 10. In one embodiment, the snub pulley 34 can be supported within the frame 14 by bearing assemblies located at opposite ends of the snub pulley 34. For example, as shown in FIG. 7, a bearing assembly 60 for the snub pulley 34 can be held within a first bracket 61. The first bracket 61 can be attached to the frame 14 by bolts 66, 68 passing through respective elongated channels 62, 64 in the frame 14. Movement of the bearing assembly 60 and the first bracket 61 with respect to the frame 14 can be achieved through rotation of a screw 70. The screw 70 is shown to have a head 71 which abuts the bearing assembly 60, and the threaded portion of the screw 70 can be threadably engaged with a second bracket 63 which is rigidly affixed to the frame (e.g., with bolts 65, 67). When the screw 70 is rotated, the first bracket 61 is moved, thereby moving the bearing assembly 60 and the snub pulley 34 and tightening/loosening the endless belt 36. Once the desired tension on the endless belt 36 is achieved, the bearing assembly 60 can be fixed in place by tightening the nuts 72, 73 and bolts 66, 68. In some embodiments, the drive pulley 30 and/or the tail pulley 20 can also be moveable in order to increase or decrease tension on the endless belt 36.

Accordingly, the endless belt 36 can be installed upon the merge conveyor 10 such that the endless belt 36 is sequentially routed over the tail pulley 20, the slider bed 28, the first nose bar 22, the drive pulley 30, the second nose bar 24, and the snub pulley 34. As shown in the embodiment of FIGS. 1–6, the endless belt 36 can extend directly from the second nose bar 24 to the snub pulley 34, and then directly to the tail pulley 20. In one embodiment of the present invention, one or both of the tail pulley 20 and the snub pulley 34 can be trapezoidal or crowned in order to facilitate better tracking of the endless belt 36 upon the merge conveyor 10.

In accordance with one embodiment of the present invention, the first nose bar 22 and the second nose bar 24 can be configured to remain stationary (i.e., not rotate) during use. Referring to FIG. 6, the portions of the first and second nose bars 22, 24 which contact the endless belt 36 can be rounded such that the endless belt 36 will pass over the first and second nose bars 22, 24 without incurring substantial friction. In a more particular embodiment of the present invention, each of the first nose bar 22 and the second nose bar 24 can have a substantially circular cross-sectional shape, and can each accordingly comprise a longitudinally extending pipe or tube. For example, each of the first nose bar 22 and the second nose bar 24 can be provided as a hard chrome-plated pipe or tube which is made of steel or some other suitable material. By providing the first nose bar 22 and the second nose bar 24 as hard chrome-plated pipes, certain advantages can be achieved with regard to elimination of friction and resultant heat generation caused by contact of the endless belt 36 with the first nose bar 22 and the second nose bar 24.

Figure 5:
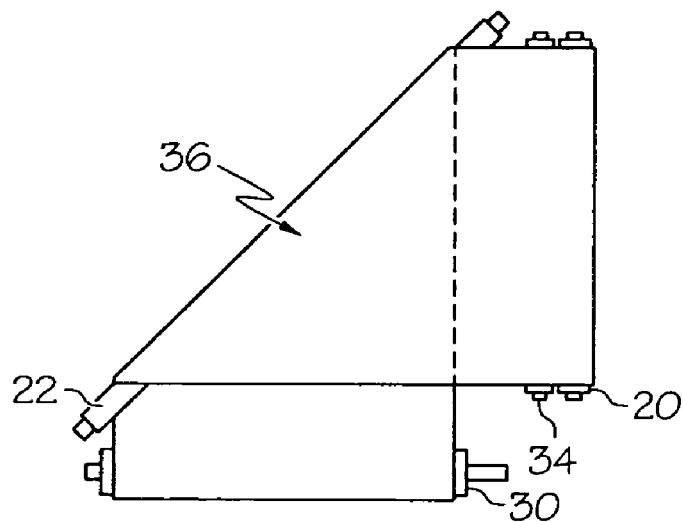
FIG. 5 is a top view depicting certain components of the merge conveyor of FIGS. 1–3 in conjunction with an endless belt.

Referring again to FIG. 6, the endless belt 36 is shown to have an inner surface 50 and an outer surface 52. It can be desirable to provide the outer surface 52 with a sticky or tacky coating, such that the outer surface 52 is stickier (i.e., tackier) than the inner surface 50. By providing a sticky outer surface 52, the merge conveyor 10 can, in some circumstances, more effectively grip cargo to be transported along the travel pathway 12. Additionally, an endless belt 36 with a sticky outer surface 52, when routed as shown in FIGS. 5–6, can experience reduced driving slip from the drive pulley 30 as compared to an endless belt having a non-sticky outer surface since the outer surface 52 is in contact with the drive pulley 30. The merge conveyor 10 can effectively accommodate an endless belt 36 having a sticky outer surface 52 because no portion of the outer surface 52 would contact any stationary items (e.g., the first nose bar 22 and/or the second nose bar 24) during movement of the endless belt 36. In fact, while the outer surface 52 can be provided with a sticky coating, the inner surface 50 can be provided with lubrication, whereby this lubrication can serve to prevent generation of substantial friction resulting from contact between the endless belt 36 and any stationary items (e.g., the first nose bar 22 and/or the second nose bar 24).

One or more side guards (e.g., 42, 44) can be provided on the frame 14 in order to assist in maintaining cargo upon the travel pathway 12 of the merge conveyor 10. It will be appreciated that the side guards can be provided in any of a number of suitable configurations. The frame 14 can also include a shroud 32 for concealing the drive pulley 30 from inadvertent contact and/or damage. In one specific embodiment of a merge conveyor 10 in accordance with the teachings of the present invention, each of the first nose bar 22 and the second nose bar 24 can have a diameter of about 2 inches (5.08 cm). The drive pulley 30 can have a 6¾ inch (17.15 cm) diameter, and the tail pulley 20 and snub pulley 34 can each have a 6 inch (15.24 cm) diameter. Bearings can be provided to interface the pulleys with the frame 14.

A merge conveyor in accordance with the teachings of the present invention can have a compact and attractive form factor. In one embodiment, the merge conveyor 10 can have an overall form factor which, from a top plan view, substantially represents that of a triangle (e.g., 54) as shown, for example, in FIG. 2. By having such a simple and compact form factor, it will be appreciated that the merge conveyor 10 can be easily and seamlessly integrated into a conveyor system without significant expense or engineering. This form factor of the merge conveyor 10 also facilitates easy access and maintenance to each of the components of the merge conveyor 10 as well to components of nearby conveyor systems.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A merge conveyor comprising:
   a frame defining a travel pathway for moving cargo, the travel pathway extending from a first end to a second end;
   a tail pulley supported by the frame adjacent to the first end of the travel pathway, the tail pulley having a first rotational axis perpendicular to the travel pathway;
   a first nose bar supported by the frame adjacent to the second end of the travel pathway, the first nose bar being disposed at an angle with respect to the travel pathway;
   a drive pulley supported by the frame and having a second rotational axis parallel with the travel pathway;
   a second nose bar supported by the frame and being parallel with and spaced from the first nose bar;
   a snub pulley supported by the frame and having a third rotational axis parallel with the first rotational axis; and
   an endless belt sequentially routed over the tail pulley, the first nose bar, the drive pulley, the second nose bar, and the snub pulley, the endless belt extending directly from the drive pulley to the second nose bar, directly from the second nose bar to the snub pulley, and then directly from the snub pulley to the tail pulley.

2. The merge conveyor of claim 1 further comprising a drive motor operatively coupled with the drive pulley.

3. The merge conveyor of claim 2 further comprising a gearbox operatively coupling the drive motor to the drive pulley.

4. The merge conveyor of claim 3 wherein the gearbox is a right-angle gearbox.

5. The merge conveyor of claim 4 wherein the drive motor is longitudinally oriented in a direction perpendicular to the first rotational axis and the second rotational axis.

6. The merge conveyor of claim 5 wherein the drive motor is substantially disposed in a position above that of the endless belt.

7. The merge conveyor of claim 1 wherein the first nose bar and the second nose bar do not rotate in use.

8. The merge conveyor of claim 7 wherein the portion of the first nose bar which contacts the endless belt is rounded, and the portion of the second nose bar which contacts the endless belt is rounded.

9. The merge conveyor of claim 8 wherein each of the first nose bar and the second nose bar have a substantially circular cross-sectional shape.

10. The merge conveyor of claim 8 wherein each of the first nose bar and the second nose bar comprise a chrome-plated steel tube.

11. The merge conveyor of claim 1 wherein the angle is within a range from about 30 degrees to about 60 degrees.

12. The merge conveyor of claim 11 wherein the angle is about 45 degrees.

13. The merge conveyor of claim 1 wherein the frame includes at least one side guard configured to maintain cargo within the travel pathway upon the endless belt.

14. The merge conveyor of claim 1 wherein the endless belt has an inner surface and an outer surface, and the outer surface is stickier than the inner surface.

15. The merge conveyor of claim 1 having an overall form factor which, from a top plan view, substantially resembles a triangle.

16. The merge conveyor of claim 1 wherein the snub pulley is movable in order to adjust tension and tracking of the endless belt.

17. The merge conveyor of claim 1 further comprising a slider bed having a surface adjacent to the travel pathway, the surface extending at least partially between the tail pulley and the first nose bar, wherein a portion of the endless belt contacts the slider bed and is configured to support cargo.

18. A merge conveyor comprising:
- a frame defining a travel pathway for moving cargo, the travel pathway extending from a first end to a second end;
- a tail pulley supported by the frame adjacent to the first end of the travel pathway, the tail pulley having a first rotational axis perpendicular to the travel pathway;
- a first nose bar having a substantially circular cross-sectional shape and being non-rotatably supported by the frame adjacent to the second end of the travel pathway, the first nose bar being disposed at an angle with respect to the travel pathway, the angle being within a range from about 30 degrees to about 60 degrees;
- a slider bed having a surface adjacent to the travel pathway, the surface extending at least partially between the tail pulley and the first nose bar;
- a drive pulley supported by the frame and having a second rotational axis parallel with the travel pathway;
- a second nose bar having a substantially circular cross-sectional shape and being non-rotatably supported by the frame and being parallel with and spaced from the first nose bar;
- a snub pulley supported by the frame and having a third rotational axis parallel with the first rotational axis;
- a drive motor oriented in a direction perpendicular to the first rotational axis and the second rotational axis;
- a right-angle gearbox operatively coupling the drive motor to the drive pulley;
- an endless belt sequentially routed over the tail pulley, the slider bed, the first nose bar, the drive pulley, the second nose bar, and the snub pulley, the endless belt extending directly from the drive pulley to the second nose bar, directly from the second nose bar to the snub pulleys and then directly from the snub pulley to the tail pulley, wherein a portion of the endless belt contacts the slider bed and is configured to support cargo; and
- at least one side guard attached to the frame and configured to maintain cargo within the travel pathway upon the endless belt.

19. The merge conveyor of claim 18 wherein each of the first nose bar and the second nose bar comprise a chrome-plated steel tube.

20. The merge conveyor of claim 18 wherein the angle is about 45 degrees.

21. The merge conveyor of claim 18 wherein the endless belt has an inner surface and an outer surface, and the outer surface is stickier than the inner surface.

22. The merge conveyor of claim 18 having an overall form factor which, from a top plan view, substantially resembles a triangle.

23. The merge conveyor of claim 18 wherein the snub pulley is movable in order to adjust tension and tracking of the endless belt.

* * * * *

UNITED STATES PATENT AND TRADEMARK OFFICE
CERTIFICATE OF CORRECTION

PATENT NO.        : 7,234,588 B1
APPLICATION NO.   : 11/301680
DATED             : June 26, 2007
INVENTOR(S)       : Lawrence Anthony Buxton It is certified that error appears in the above-identified patent and that said Letters Patent is hereby corrected as shown below:

Claim 18, column 8, line 7 - change "pulleys" to --pulley,--.

Signed and Sealed this

Sixteenth Day of October, 2007

JON W. DUDAS
*Director of the United States Patent and Trademark Office*